United States Patent
Abe et al.

(10) Patent No.: US 9,505,925 B2
(45) Date of Patent: Nov. 29, 2016

(54) PHENOL RESIN MOLDING MATERIAL, FRICTION MATERIAL, AND PHENOL RESIN MOLDED PRODUCT

(71) Applicant: Mitsui Chemicals, Inc., Minato-ku (JP)

(72) Inventors: Takaharu Abe, Nagoya (JP);
Masanobu Maeda, Ichihara (JP);
Takahiro Yamada, Ichihara (JP);
Yasunori Yoshida, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 51 days.

(21) Appl. No.: 14/387,888

(22) PCT Filed: Mar. 12, 2013

(86) PCT No.: PCT/JP2013/001612
§ 371 (c)(1),
(2) Date: Sep. 25, 2014

(87) PCT Pub. No.: WO2013/145594
PCT Pub. Date: Oct. 3, 2013

(65) Prior Publication Data
US 2015/0080519 A1    Mar. 19, 2015

(30) Foreign Application Priority Data

Mar. 29, 2012  (JP) ................. 2012-076575

(51) Int. Cl.
*C08L 61/06*     (2006.01)
*F16D 69/02*     (2006.01)
(Continued)

(52) U.S. Cl.
CPC .............. *C08L 61/06* (2013.01); *C08F 8/06* (2013.01); *C08F 255/02* (2013.01); *C08G 8/08* (2013.01); *C08L 23/30* (2013.01); *C08L 51/06* (2013.01); *F16D 69/025* (2013.01)

(58) Field of Classification Search
CPC ........ C08L 51/06; C08L 23/30; C08L 61/06; C08F 8/06; C08F 255/02; C08F 222/06; C08G 8/08; F16D 69/025
USPC ........................................ 524/509; 525/132
See application file for complete search history.

(56) References Cited

U.S. PATENT DOCUMENTS 4,670,508 A * 6/1987 Ohdaira ................ C08L 101/00
524/495
2004/0232532 A1    11/2004 Kuroda
(Continued)

FOREIGN PATENT DOCUMENTS

CN    1443792 A    9/2003
CN    1557851 A    12/2004
(Continued)

OTHER PUBLICATIONS

JP 2001-089634 A (2001), machine translation, JPO/INPIT Japan Platform for Patent Information (J-PlatPat).*
(Continued)

*Primary Examiner* — Susannah Chung
*Assistant Examiner* — Josephine Chang
(74) *Attorney, Agent, or Firm* — Buchanan, Ingersoll & Rooney PC

(57) ABSTRACT

A phenol resin molding material includes a modified olefin-based polymer particle (I) and a phenol resin (II). It is preferable that the modified olefin-based polymer particle (I) satisfy at least one of the requirements (A), (B), and (C) which are defined as follows: (A) Inclusion of at least one element selected from a group consisting of a group 15 element, a group 16 element, and a group 17 element of the periodic table. (B) When the whole of the above-described olefin-based polymer particle (I) is set as 100 wt %, the content of the above-described elements is greater than or equal to 0.05 wt % and less than or equal to 50 wt %. (C) MFR which is measured under the conditions of 190° C. and 2.16 kgf based on JIS K 7210 is greater than or equal to 0.001 g/10 minutes and less than 3 g/10 minutes.

9 Claims, 3 Drawing Sheets

(51) Int. Cl.
*C08G 8/08* (2006.01)
*C08L 51/06* (2006.01)
*C08L 23/30* (2006.01)
*C08F 255/02* (2006.01)
*C08F 8/06* (2006.01)

(56) References Cited

U.S. PATENT DOCUMENTS

2005/0070664 A1 3/2005 Takashima et al.
2006/0094797 A1 5/2006 Murotani et al.

FOREIGN PATENT DOCUMENTS

| CN | 101824295 A | 9/2010 |
| JP | 59-6246 A | 1/1984 |
| JP | 60-184533 A | 9/1985 |
| JP | 61-218663 A | 9/1986 |
| JP | 63-196648 A | 8/1988 |
| JP | 2001-089634 A | 4/2001 |
| JP | 2001089634 A * | 4/2001 |
| JP | 2003-41123 A | 2/2003 |
| JP | 2004-175969 A | 6/2004 |
| JP | 2006-265321 A | 10/2006 |
| JP | 2009-536891 A | 10/2009 |
| JP | 2011-80013 A | 4/2011 |
| KR | 10-2010-0072548 A | 7/2010 |
| WO | WO 2007/133205 A1 | 11/2007 |

OTHER PUBLICATIONS

JP 2006-265321 A (2006), machine translation, JPO/INPIT Japan Platform for Patent Information (J-PlatPat).*
Search Report issued by the European Patent Office in corresponding European Patent Application No. 13768990.7 on Oct. 12, 2015 (8 pages).
International Search Report (PCT/ISA/210) mailed on Jun. 11, 2013, by the Japanese Patent Office as the International Searching Authority for International Application No. PCT/JP2013/001612.

* cited by examiner

PHENOL RESIN MOLDING MATERIAL, FRICTION MATERIAL, AND PHENOL RESIN MOLDED PRODUCT

TECHNICAL FIELD

The present invention relates to a phenol resin molding material, a friction material, and a phenol resin molded product.

BACKGROUND ART

Phenol resin is excellent in mechanical characteristics, electric characteristics, heat resistance, and adhesiveness, and is used as a binder for friction material such as a disk pad or drum brake lining.

A non-asbestos type disk pad in which asbestos is not used due to the problem of carcinogenicity has been widely used in Japan, Korea, and North America. However, in some cases, there are problems relating to squeal and judder (NVH: noise, vibration, and harsh).

In particular, a phenomenon called morning squeal, which is a large squeal or vibration generated during first few times of braking after a car starts from a garage in the morning in winter when the temperature is low, is regarded as a problem. In the morning in winter when the temperature is low, the braking when a driver lightly steps on a brake causes an urgent brake, and as a result, a sound or a vibration is generated in some cases.

There are cases where the same case as above occurs even after parking a vehicle for a long period of time in the rain or even in an area with a high humidity, not only in the morning.

It is almost impossible for the system to deal with such a problem. Therefore, it is necessary to provide resin, which is used in the disk pad, with low hygroscopicity and high vibration absorbency for absorbing or reducing the squeal and the judder.

In order to improve the characteristics of the phenol resin, various studies in modified phenol resins such as elastomer-modified phenol resins, oil-modified phenol resins, cashew-modified phenol resins, silicone-modified phenol resins, epoxy-modified phenol resins, and melamine-modified phenol resins.

Patent Document 1 (Japanese Unexamined Patent Publication No. 60-184533) discloses technology of mixing acrylonitrile-butadiene rubber (NBR) with the phenol-based resin in order to improve impact resistance and flexibility. However, the particle diameter of NBR is greater than 200 µm and NBR has poor compatibility with the phenol-based resin. For this reason, NBR has poor dispersibility in the phenol resin, and therefore, it is necessary to mix a large quantity of NBR in order to improve the impact resistance and the flexibility. When the mixing quantity of NBR is large, heat resistance deteriorates and an interface between phenol resin phase and NBR phase is separated.

In addition, there is technology of using elastomer-modified phenol resins with carboxy-terminal liquid NBR in order to improve the problem of the dispersibility. When curing of the phenol resin progresses using a curing agent, toughness is added to the phenol resin due to the elastomer, which is dissolved therein, is phase-separated into a spherical shape. However, due to the use of the phase separation during the curing, the curing of the phenol resin tends to be greatly affected by curing conditions such as the type of curing agents, the temperature, and time, and thus, it is hard to obtain stable characteristics of cured material.

Patent Document 2 (Japanese Unexamined Patent Publication No. 59-6246) discloses a thermosetting resin composition through which it is possible to obtain a cured material excellent in heat resistance, flexibility, and dimensional stability and which is formed of a copolymer having isopropenylphenol as a component, and phenol resin. However, there is no specific examination relating to the resin composition providing a cured material excellent in wear resistance and vibration absorbency.

Patent Document 3 (Japanese Unexamined Patent Publication No. 2006-265321) discloses a phenol resin molding material containing phenol resin and high molecular weight polyethylene, as a molded product excellent in mechanical strength and wear resistance. Since the phenol resin molding material contains the high molecular weight polyethylene, fine matrix is formed on a surface. As a result, the hardness becomes hard, thereby improving the wear characteristics.

RELATED DOCUMENT

Patent Document

[Patent Document 1] Japanese Unexamined Patent Publication No. 60-184533

[Patent Document 2] Japanese Unexamined Patent Publication No. 59-6246

[Patent Document 3] Japanese Unexamined Patent Publication No. 2006-265321

DISCLOSURE OF THE INVENTION

However, according to examinations of the present inventors, it has became clear that the phenol resin molding material containing phenol resin and high molecular weight polyethylene has poor hygroscopicity resistance and vibration absorbency and the level of the wear resistance is also insufficient.

The present invention has been made in consideration of the above-described problems, and an object of the invention is to provide a phenol resin molding material through which it is possible to obtain a cured material excellent in hygroscopicity resistance, vibration absorbency, and wear resistance while having excellent heat resistance and mechanical strength.

The present inventors have conducted extensive studies in order to achieve the above-described problems, and as a result, they have completed the present invention by finding that it is possible to improve the hygroscopicity resistance, the vibration absorbency, and the wear resistance while the phenol resin has the heat resistance and the mechanical strength, by improving an adhesive strength of the interface between an olefin-based polymer particle and the phenol resin.

That is, according to the present invention, the phenol resin molding material, the friction material, and the phenol resin molded product which are shown in the following is provided.

[1]

A phenol resin molding material including: a modified olefin-based polymer particle (I) and a phenol resin (II).

[2]

The phenol resin molding material according to the above [1], in which the modified olefin-based polymer particle (I) satisfies the following requirements (A) and (B).

(A) Inclusion of at least one element selected from a group consisting of a group 15 element, a group 16 element, and a group 17 element of the periodic table.

(B) When the whole of the modified olefin-based polymer particle (I) is set as 100 wt %, the content of the above-described elements is greater than or equal to 0.05 wt % and less than or equal to 50 wt %.

[3]

The phenol resin molding material according to the above [1] or [2], in which the modified olefin-based polymer particle (I) satisfies the following requirement (C).

(C) MFR which is measured under the conditions of 190° C. and 2.16 kgf based on JIS K 7210 is greater than or equal to 0.001 g/10 minutes and less than 3 g/10 minutes.

[4]

The phenol resin molding material according to any one of the above [1] to [3], in which the average particle diameter $d_{50}$ in weight base particle size distribution, which is measured by a coulter counter method, of the modified olefin-based polymer particle (I) is less than or equal to 150 μm.

[5]

The phenol resin molding material according to any one of the above [1] to [4], in which the weight ratio of the modified olefin-based polymer particle (I) to the phenol resin (II) is greater than or equal to 1/99 and less than or equal to 30/70.

[6]

The phenol resin molding material according to any one of the above [1] to [5], in which the modified olefin-based polymer particle (I) is obtained by modifying a polyolefin particle using at least one kind of an oxygen-containing group selected from a group consisting of a carbonyl group and a hydroxyl group.

[7]

The phenol resin molding material according to any one of the above [1] to [5], in which the modified olefin-based polymer particle (I) is obtained by modifying a polyolefin particle using at least one kind of carboxylic acid derivative selected from a group consisting of carboxylic acid, carboxylic acid anhydride, carboxylate, and carboxylic acid ester which contain an ethylenically unsaturated group.

[8]

The phenol resin molding material according to the above [6] or [7], in which the modified polyolefin particle is modified polyethylene.

[9]

The phenol resin molding material according to any one of the above [6] to [8], in which the intrinsic viscosity [η] of the modified polyolefin particle which is measured at a temperature of 135° C. in decalin is greater than or equal to 1 dl/g and less than or equal to 50 dl/g.

[10]

The phenol resin molding material according to any one of the above [6] to [9], in which the weight average molecular weight, of the modified polyolefin particle which is measured by high temperature GPC is greater than or equal to $1.0 \times 10^6$.

[11]

The phenol resin molding material according to any one of the above [1] to [10], in which the phenol resin molding material further includes curing agent (III).

[12]

The phenol resin molding material according to the above [11], in which the mixing amount of the curing agent (III) is greater than or equal to 3 parts by weight and less than or equal to 20 parts by weight when the total of the modified olefin-based polymer particle (I) and the phenol resin (II) is set as 100 parts by weight.

[13]

The phenol resin molding material according to any one of the above [1] to [12], further including: at least one kind of additive selected from a group consisting of fiber, filler, lubricant, and abrasive, in which the mixing amount of the additive is greater than or equal to 80 parts by weight and less than or equal to 95 parts by weight when the whole of the phenol resin molding material was set as 100 parts by weight.

[14]

A friction material which is obtained by curing the phenol resin molding material according to any one of the above [1] to [13].

[15]

The friction material according to the above [14] which is used in a brake pad or whetstone.

[16]

A phenol resin molded product obtained by thermally molding a molding material containing a phenol resin and a modified olefin-based polymer particle, in which a particle having a ductile destructed surface exists on a fracture surface which is formed by crushing the phenol resin molded product.

[17]

The phenol resin molded product according to the above [16], in which the number ratio of particles having a ductile destructed surface existing on the fracture surface is greater than or equal to 40%.

According to the present invention, it is possible to provide the phenol resin molding material through which it is possible to obtain the cured material excellent in hygroscopicity resistance, vibration absorbency, and wear resistance while having excellent heat resistance and mechanical strength.

BRIEF DESCRIPTION OF THE DRAWINGS

The above-described purpose and other purposes, characteristics, and advantages become clearer from the preferred embodiment and the accompanying drawings described below.

DESCRIPTION OF EMBODIMENTS

Figure 1:
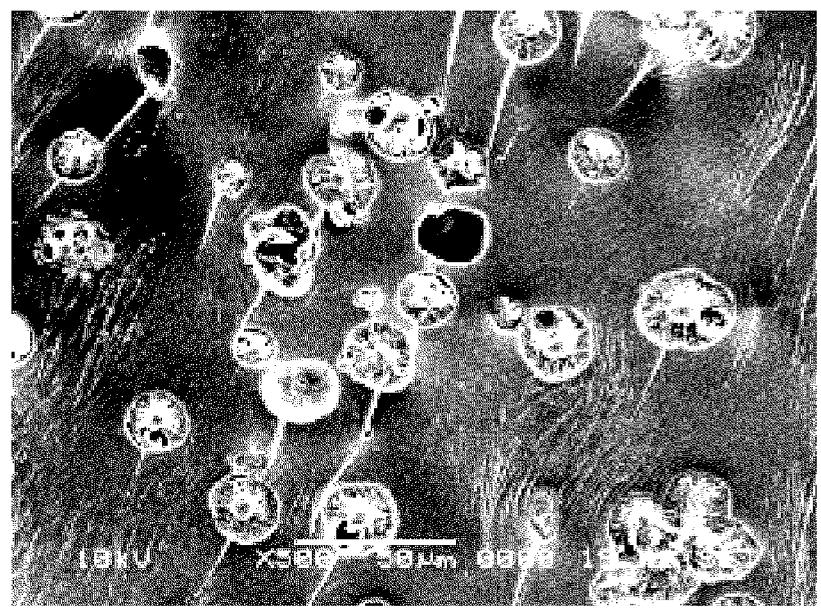
FIG. 1 shows a view showing an SEM photograph showing a fracture surface of a phenol resin molded product in Example 1.
Figure 2:
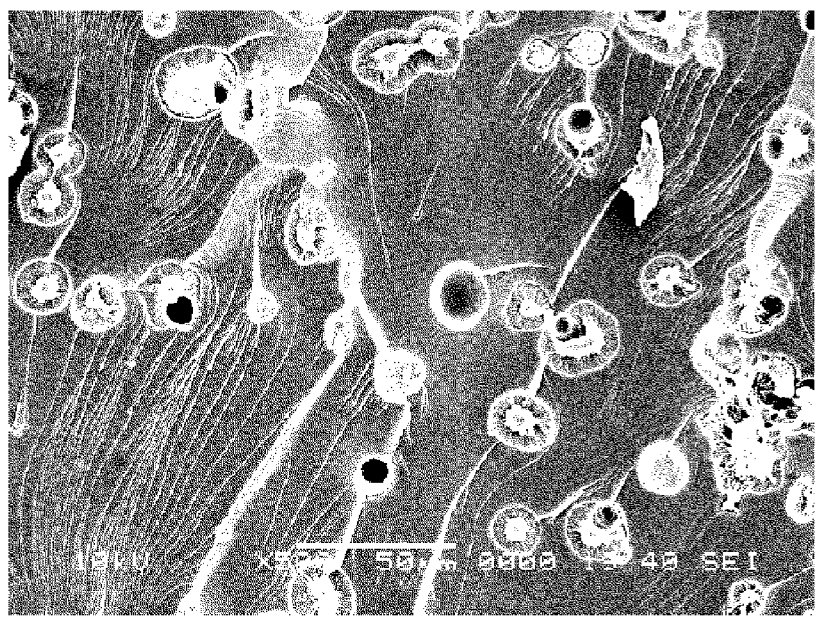
FIG. 2 shows a view showing an SEM photograph showing a fracture surface of a phenol resin molded product in Example 2.
Figure 3:
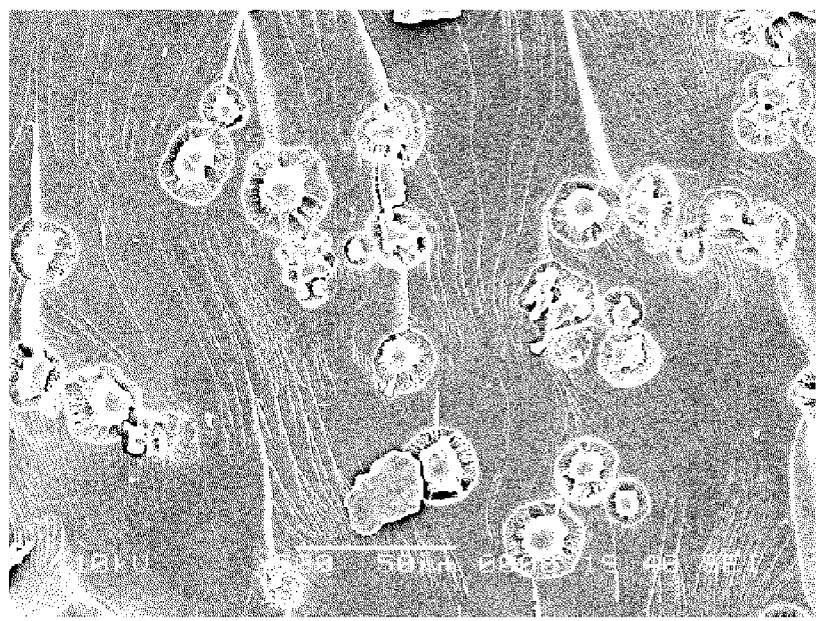
FIG. 3 shows a view showing an SEM photograph showing a fracture surface of a phenol resin molded product in Example 3.
Figure 4:
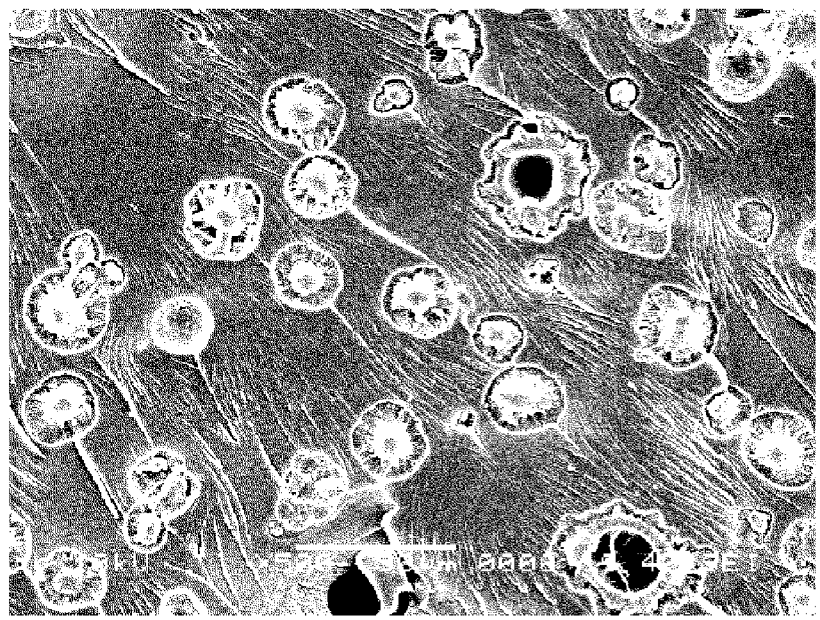
FIG. 4 shows a view showing an SEM photograph showing a fracture surface of a phenol resin molded product in Example 4.

Hereinafter, an embodiment of the present invention will be described. Note that "to" represents "greater than or equal to . . . and less than or equal to . . . " unless otherwise noted.

A phenol resin molding material according to the present embodiment includes a modified olefin-based polymer particle (I) and phenol resin (II) as essential components.

(Modified Olefin-Based Polymer Particle (I))

The modified olefin-based polymer particle (I) according to the present embodiment is a polymer particle which can be obtained by polymerizing an olefin. It is preferable that at least any one of the following requirements (A), (B), and (C) be satisfied, it is more preferable that all of the following requirements (A) and (B) be satisfied, and it is particularly preferable that all of the following requirements (A), (B), and (C) be satisfied.

(A) Inclusion of at least one element selected from a group consisting of a group 15 element, a group 16 element, and a group 17 element of the periodic table.

(B) When the whole of the modified olefin-based polymer particle (I) is set as 100 wt %, the content of the above-described elements is greater than or equal to 0.05 wt % and less than or equal to 50 wt %.

(C) MFR which is measured under the conditions of 190° C. and 2.16 kgf based on JIS K 7210 is greater than or equal to 0.001 g/10 minutes and less than 3 g/10 minutes.

At least one element selected from the group consisting of the group 15 element, the group 16 element, and the group 17 element of the periodic table is preferably oxygen.

(Composition of Polyolefin Particle of Raw Material)

An example of a polyolefin particle as a raw material of the modified olefin-based polymer particle (I) according to the present embodiment includes a polymer particle composed of a homopolymer such as polyethylene, polypropylene, poly-1-butene, and poly-4-methyl-1-pentene. In addition, the polymer particle may be composed of ethylene and small amounts of other α-olefins such as propylene, 1-butene, 1-hexene, 1-octene, and 4-methyl-1-pentene. Among these, a polymer particle composed of a polymer using the ethylene as a monomer is preferable and polyethylene is particularly preferable.

Part 1 of (Molecular Weight of Polyolefin Particle of Raw Material)

In the polyolefin particle as a raw material of the modified olefin-based polymer particle (I) according to the present embodiment, the intrinsic viscosity [η] which is measured at a temperature of 135° C. in decalin is preferably within a range of 1 dl/g to 50 dl/g, more preferably within a range of 5 dl/g to 40 dl/g, and particularly preferably within a range of 5 dl/g to 30 dl/g. When the intrinsic viscosity [η] is greater than or equal to 1, the heat resistance improves, thereby obtaining a sufficient improving effect of the wear resistance.

Part 2 of (Molecular Weight of Polyolefin Particle of Raw Material)

In the polyolefin particle as a raw material of the modified olefin-based polymer particle (I) according to the present embodiment, the weight average molecular weight measured by high temperature GPC is preferably greater than or equal to $1.0 \times 10^6$. When the weight average molecular weight measured by the high temperature GPC is greater than or equal to $1.0 \times 10^6$, the heat resistance improves, thereby obtaining a sufficient improving effect of the wear resistance.

(Average Particle Diameter of Polyolefin Particle of Raw Material)

The average particle diameter $d_{50}$ in weight base particle size distribution, which is measured by a coulter counter method, of the polyolefin particle as a raw material of the modified olefin-based polymer particle (I) according to the present embodiment is preferably less than or equal to 150 μm, more preferably less than or equal to 80 μm, still more preferably less than or equal to 60 μm, and particularly preferably less than or equal to 45 μm.

When the average particle diameter during the molding is less than or equal to 150 μm, it is possible to further improve the mechanical strength and molding appearance. The lower limit value of the average particle diameter is not particularly limited, but it is preferable that the lower limit value thereof be greater than or equal to 3 μm from the viewpoint of handleability, easy accessibility, and the like.

(Method of Producing Polyolefin Particle of Raw Material)

The polyolefin particle as a raw material of the modified olefin-based polymer particle (I) according to the present embodiment can be produced through the methods disclosed in Japanese Unexamined Patent Publication Nos. 60-163935 and 2011-80013, for example. The polyolefin particle can be produced through a method of copolymerizing ethylene alone or ethylene and other α-olefins in the presence of a polymerization catalyst component formed of a solid catalyst component, in which a transition metal compound or a liquid titanium compound is carried on a magnesium-containing fine particle, a organic metal compound and a non-ionic surfactant if desired, for example.

(Configuration of Portion Containing Oxygen in Modified Olefin-Based Polymer Particle (I))

An example of a configuration of a portion containing oxygen in a modified olefin-based polymer particle (I) according to the present embodiment includes a polymer structure which is obtained by polymerizing at least one kind of a carboxylic acid derivative selected from a group consisting of carboxylic acid, carboxylic acid anhydride, carboxylate, and carboxylic acid ester which contain an oxygen-containing group, such as carboxyl group and a hydroxyl group, and/or an ethylenically unsaturated group. The structures containing oxygen may be used alone or in combination of two or more.

Examples of the carboxylic acid derivatives containing the ethylenically unsaturated group according to the present embodiment include: alkyl ester derivatives of an acrylic acid or a methacrylic acid, such as aminoethyl (meth)acrylate, propyl-aminoethyl (meth)acrylate, dimethylaminoethyl methacrylate, aminopropyl (meth)acrylate, phenyl aminoethyl methacrylate, and cyclohexyl aminoethyl methacrylate acid; allylamine derivatives such as methacrylic amine, N-methyl acrylate amine, N,N-dimethyl acryl amine, N,N-dimethylaminopropyl acrylate amine; acrylamide derivatives such as acrylamide and N-methyl acrylamide; amino group-containing ethylenically unsaturated compounds such as 6-aminohexyl succinimide and 2-amino ethyl succinimide; epoxy group-containing ethylenically unsaturated compound such as glycidyl acrylate, glycidyl methacrylate, mono- and dialkyl glycidyl ester of dicarboxylic acid (1 carbon atom to 12 carbon atoms of an alkyl group in a case of monoglycidyl ester), such as mono- and diglycidyl ester of maleic acid, mono- and diglycidyl ester of fumaric acid, mono- and diglycidyl ester of crononic acid, mono- and diglycidyl ester of tetrahydrophthalic acid, mono- and diglycidyl ester of itaconic acid, mono- and diglycidyl ester of butane tricarboxylic acid, mono- and diglycidyl ester of citraconic acid, mono- and diglycidyl ester of endo-cis-bicyclo[2.2.1]hept-5-ene-2,3-dicarboxylic acid (Nadic Acid™), and mono- and diglycidyl ester of endo-cis-bicyclo[2.2.1]hept-5-ene-2-methyl-2,3-dicarboxylic acid (Methylnadic Acid™), mono- and diglycidyl ester of allyl succinic acid, and alkylglycidyl esters of p-stylene-carboxylic acid, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monoxide; silyl group-containing ethylenically unsaturated compound such as vinylsilanes such as vinyl trimethoxysilane, vinyl triethoxysilane, vinyl tri(β-methoxyethoxy)silane, vinyltriacetoxysilane, vinyl dimethylmethoxysilane, vinyl methyldiethoxysilane, vinyl methyldimethoxysilane, and vinyldimethylethoxysilane, and acryloxypropyltrimethoxysilane, methacryloxypropyltrimethoxysilane, methacryloxypropylmethyldimethoxysilane, and methacryloxypropyldimethylmethoxysilane; carboxylic acid such as acrylic acid, methacrylic acid, maleic acid, fumaric acid, itaconic acid, citraconic acid; carboxylic acid anhydride such as bicyclo[2.2.1]hept-2-ene-5,6-dicarboxylic acid anhydride; carboxylate such as sodium acrylate, sodium methacrylate, potassium methacrylate, maleic acid disodium, dipotassium maleic acid, maleic acid monosodium, disodium fumarate, itaconic acid dilithium, citraconic acid diammonium, and bicyclo[2.2.1]hept-2-ene-5,6-dicarboxylic acid sodium; and carboxylic acid ester such as methyl acrylate, methyl methacrylate, acrylic acid glycidyl ester, dimethyl maleate, monomethyl maleate, dimethyl fumarate, diethyl itaconate, dimethyl citraconate, and dimethyl bicyclo[2.2.1]hept-2-ene-5,6-dicarboxylic acid. Among these, carboxylic acid, carboxylic acid anhydride, carboxylate or carboxylic acid ester is preferable, and carboxylic acid anhydride is more preferable, and maleic anhydride is particularly preferable.

(Bonding Form of Structure Containing Polyolefin Particle and Oxygen)

The above-described structure containing oxygen is bonded to any of a polymer main chain, a polymer side chain, and a polymer end of the polyolefin particle of the raw material. In a case of a polymer structure obtained by polymerizing at least one kind of a carboxylic acid derivative selected from a group consisting of carboxylic acid, carboxylic acid anhydride, carboxylate, and carboxylic acid ester containing the ethylenically unsaturated group, it is possible to obtain the structure through various graft polymerization reactions which are commonly known. The polymer structures are bonded to any of the polymer main chain, the polymer side chain, and the polymer end of the polyolefin particle of the raw material as a graft chain.

(Oxygen Content of Modified Olefin-Based Polymer Particle (I))

The oxygen content of the modified olefin-based polymer particle (I) according to the present embodiment is, when the whole of the modified olefin-based polymer particle (I) is set as 100 wt %, preferably within a range of 0.05 wt % to 50 wt %, more preferably within a range of 0.05 wt % to 30 wt %, and still more preferably within a range of 0.1 wt % to 10 wt %.

When the oxygen content is greater than or equal to 0.05 wt %, the compatibility between the modified olefin-based polymer particle (I) and the phenol resin (II) improves, thereby improving the adhesive strength. As a result, it is possible to suppress separation of the interface between the modified olefin-based polymer particle (I) and the phenol resin (II), thereby improving the hygroscopic resistance, the vibration absorbency, and the wear resistance. In addition, when the oxygen content is less than or equal to 50 wt %, it is possible to improve the hygroscopic resistance.

(MFR of Modified Olefin-Based Polymer Particle (I))

In the modified olefin-based polymer particle (I) according to the present embodiment, MFR which is measured under the conditions of 190° C. and 2.16 kgf based on JIS K 7210 is preferably greater than or equal to 0.001 g/10 minutes and less than 3 g/10 minutes, more preferably greater than or equal to 0.001 g/10 minutes and less than or equal to 0.03 g/10 minutes, still more preferably greater than or equal to 0.001 g/10 minutes and less than or equal to 0.01 g/10 minutes, and particularly preferably greater than or equal to 0.001 g/10 minutes and less than 0.01 g/10 minutes. When MFR is less than 3 g/10 minutes, it is possible to improve the heat resistance.

In addition, it a portion in the polymer of the modified olefin-based polymer particle (I) may be cross-linked. When a portion thereof has a cross-linked structure, it is possible to further improve the heat resistance of an obtained cured material.

(Average Particle Diameter of Modified Olefin-Based Polymer Particle (I))

The average particle diameter $d_{50}$ in weight base particle size distribution, which is measured by a coulter counter method, of the modified olefin-based polymer particle (I) according to the present embodiment is preferably less than or equal to 150 µm, more preferably less than or equal to 80 µm, still more preferably less than or equal to 60 µm, and particularly preferably less than or equal to 45 µm.

When the average particle diameter during the molding is less than or equal to 150 µm, it is possible to further improve the mechanical strength and the molding appearance. The lower limit value of the average particle diameter is not particularly limited, but it is preferable that the lower limit value thereof be greater than or equal to 3 µm from the viewpoint of handleability, easy accessibility, and the like.

(Method of Producing Modified Olefin-Based Polymer Particle (I))

The method of producing the modified olefin-based polymer particle (I) according to the present embodiment is not particularly limited. Examples thereof include (i) a method of copolymerizing an olefin and a polar monomer, (ii) a method of introducing a functional group to a polyolefin particle later, and (iii) a method of grafting the polar monomer to the polyolefin particle later. Among these, (ii) the method of introducing a functional group to a polyolefin particle later and (iii) the method of grafting the polar monomer to the polyolefin particle later are preferable in terms of easy production.

As (ii) the method of introducing the functional group to the polyolefin particle later, for example, a radical, which is generated in the polyolefin particle, is reacted with at least one kind of an oxygen-containing group selected from a group consisting of a carbonyl group and a hydroxyl group, to introduce the oxygen-containing group to the polyolefin particle. By doing this, it is possible to obtain a modified polyolefin particle which is modified by at least any one kind of the oxygen-containing group selected from the group consisting of the carbonyl group and the hydroxyl group.

As (iii) the method of grafting the polar monomer to the polyolefin particle later, for example, using a radical, which is generated in the polyolefin particle, as a starting point, at least one kind of a carboxylic acid derivative selected from a group consisting of carboxylic acid, carboxylic acid anhydride, carboxylate, and carboxylic acid ester which contain an ethylenically unsaturated group is subjected to graft polymerization. By doing this, it is possible to obtain a modified polyolefin particle which is modified by the carboxylic acid derivative. Examples of the graft polymerization method include (iii-1) a suspension graft method in which the reaction is carried out in the presence of a radical initiator in a suspension liquid state, (iii-2) a radiation graft method in which electron rays, γ-rays, and the like are used.

(i) Method of Copolymerizing Olefin and Polar Monomer

The method of producing the modified olefin-based polymer particle (I) through a copolymerization reaction is not particularly limited, but an example thereof includes the method disclosed in Japanese Unexamined Patent Publication No. 2005-120171. The modified olefin-based polymer particle (I) can be produced through a method of copolymerizing ethylene alone or ethylene and other α-olefins in the presence of the polar monomer or a method of copolymerizing the polar monomer and ethylene alone or ethylene and other α-olefins, similarly to the above, in the presence of radical initiator.

(iii-1) Suspension Graft Method

In the suspension graft method, examples of reaction solvents forming a suspension liquid include: aromatic hydrocarbon-based solvents such as benzene, biphenyl, toluene, xylene, and benzonitrile; aliphatic hydrocarbon-based solvents such as pentane, hexane, heptane, octane, nonane, and decane; alicyclic hydrocarbon solvents such as cyclohexane, methyl cyclohexane, and decahydronaphthalene; and chlorinated hydrocarbon solvents such as chlorobenzene, dichlorobenzene, trichlorobenzene, methylene chloride, chloroform, carbon tetrachloride, and tetrachloroethylene. Among these, benzene, biphenyl, toluene, xylene, chlorobenzene, dichlorobenzene, trichlorobenzene, and benzonitrile are preferable. In addition, these solvents may be used alone or in a combination thereof.

In the suspension graft method, the use rate of at least one kind of the carboxylic acid derivative selected from the group consisting of carboxylic acid, carboxylic acid anhydride, carboxylate, and carboxylic acid ester which contain an ethylenically unsaturated group is usually within a range of 0.1 parts by weight to 300 parts by weight, and preferably within a range of 1 part by weight to 100 parts by weight, with respect to 100 parts by weight of the polyolefin particle as a raw material of the modified olefin-based polymer particle (I).

Examples of the above-described radical initiators include organic peroxides such as: peroxy ketals such as 1,1-bis(t-butylperoxy)-3,5,5-trimethylcyclohexane, 1,1-bis(t-butylperoxy)cyclohexane, 2,2-bis(t-butylperoxy)octane, n-butyl-4,4-bis(t-butylperoxy)valerate, and 2,2-bis(t-butylperoxy)butane; dialkyl peroxides such as di-t-butyl peroxide, dicumyl peroxide, t-butyl cumyl peroxide, α,α-bis(t-butylperoxy-m-isopropyl)benzene, 2,5-dimethyl-2,5-bis(t-butylperoxy)hexane, and 2,5-dimethyl-2,5-bis(t-butylperoxy)hexyne-3; diacyl peroxides such as acetyl peroxide, isobutyryl peroxide, octanoyl peroxide, decanoyl peroxide, lauroyl peroxide, 3,5,5-trimethyl hexanoyl peroxide, benzoyl peroxide, 2,4-dichlorobenzoyl peroxide, and m-toluoyl peroxide; peroxy esters such as t-butyl peroxy acetate, t-butyl peroxy isobutyrate, t-butyl peroxy-2-ethylhexanoate, t-butyl peroxy laurate, t-butyl peroxy benzoate, di-t-butyl peroxyisophthalate, 2,5-dimethyl-2,5-di(benzoyl peroxy)hexane, t-butyl peroxy maleic acid, t-butyl peroxy isopropyl carbonate, and cumylperoxy octoate; and hydroperoxides such as t-butyl hydroperoxide, cumene hydroperoxide, diisopropyl benzene hydroperoxide, 2,5-dimethylhexane-2,5-dihydroperoxide, and 1,1,3,3-tetramethylbutyl hydroperoxide. The use rate thereof is usually within a range of 0.1 parts by weight to 100 parts by weight with respect to 100 parts by weight of the polyolefin particle.

The graft polymerization using the suspension graft method is not particularly limited, but is usually carried out under heating. The polymerization temperature thereof is usually within a range of 50° C. to 130° C., and preferably within a range of 80° C. to 120° C.

The modified olefin-based polymer particle (I) is obtained by filtering, washing, and drying the mixture after the completion of the polymerization.

(iii-2) Radiation Graft Method

As the radiation graft method, there is a pre-irradiation method, that is, graft-polymerizing the carboxylic acid derivative containing an ethylenically unsaturated group using a generated radical as a starting point, after previously irradiating the polyolefin particle, as a raw material of the modified olefin-based polymer particle (I), with radioactive rays; and a simultaneous irradiation method, that is, irradiating the polyolefin particle with the radioactive rays in an atmosphere or in a solution containing the carboxylic acid derivative containing the ethylenically unsaturated group. The present invention is not particularly limited in the present embodiment and any of the methods may be used.

In addition, in the present embodiment, it is possible to introduce at least one kind of an oxygen-containing group selected from the group consisting of carbonyl group and hydroxyl group, to the polyolefin particle, by irradiating the polyolefin particle with ionizing radioactive rays in the coexistence of oxygen to generate a radical in a polyolefin particle and to react the radical thereof and oxygen. By doing this, it is possible to obtain a modified polyolefin particle which is modified by at least any one kind of the oxygen-containing group selected from the group consisting of the carbonyl group and the hydroxyl group.

The ionizing radioactive rays in the present embodiment are not particularly limited as long as the radioactive rays can cause an ionization phenomenon by reacting to a substance, but examples thereof include γ-rays, X-rays, β-rays, electron rays, and α-rays. Among these, electron rays or γ-rays are preferable in terms of being suitable for industrial production, and being particularly capable of evenly generating the radical.

In a case where the polyolefin particle is a polyethylene particle, the exposure dose of the radioactive rays is usually greater than or equal to 10 kGy and less than or equal to 800 kGy, and preferably greater than or equal to 10 kGy and less than or equal to 300 kGy. When the exposure dose is greater than or equal to the above-described lower limit value, it is possible to suppress the deterioration of the polyethylene particle. In addition, when the exposure dose is less than or equal to the above-described upper limit value, it is possible to sufficiently generate the radical which becomes a starting point of the graft polymerization.

The polymerization solvent in the graft polymerization using the pre-irradiation method is not particularly limited, but it is preferable to use alcohols such as methanol, ethanol, isopropyl alcohol, and butanol.

In the graft polymerization using the pre-irradiation method, the use rate of at least one kind of the carboxylic acid derivative selected from the group consisting of carboxylic acid, carboxylic acid anhydride, carboxylate, and carboxylic acid ester which contain an ethylenically unsaturated group is usually within a range of 0.1 parts by weight to 300 parts by weight, and preferably within a range of 1 part by weight to 100 parts by weight, with respect to 100 parts by weight of the polyolefin particle as a raw material of the modified olefin-based polymer particle (I).

The polymerization temperature of the graft polymerization using the radiation graft method is usually within a range of 20° C. to 80° C. and preferably within a range of 20° C. to 60° C. The modified olefin-based polymer particle (I) is obtained by filtering, washing, and drying the mixture after the completion of the polymerization.

(Others) Classification and Pulverization

In the modified olefin-based polymer particle (I) according to the present embodiment, the obtained particle may be used as it is and may be classified. In addition, an obtained particle by mechanical pulverizing a substance, which is formed in a shape other than a particle, through a well-known method such as mechanical pulverization, freeze-pulverization, and chemical pulverization, may be used as it is and may be classified.

(Phenol Resin (II))

The phenol resin (II) is a polymer of a phenol compound and a compound having a bivalent linking group.

Examples of the phenol resin (II) include phenol novolac resins, residues which are obtained by removing a bisphenol body from the novolac resins, resol-type phenol resins, phenol-dicyclopentadiene resins, phenol aralkyl resins, biphenyl aralkyl resins, naphthol aralkyl resins, and aniline aralkyl resins, and these can be used alone and in a combination thereof. Among these, phenol novolac resins are preferable in terms of easy accessibility and a low cost.

Next, a method of producing the phenol resin (II) will be described.

The phenol resin (II) according to the present embodiment is not particularly limited, but for example, it is possible to obtain the phenol resin by reacting the phenol compound and aldehydes in the presence of an acid catalyst.

Examples of phenol compound used include phenol, o-cresol, m-cresol, and p-cresol. Among these, phenol is preferable. The phenol compound may be used alone and in a combination of two or more thereof.

In addition, examples of the compound having a bivalent linking group include aldehydes such as formaldehyde and paraformaldehyde. Formaldehyde is more preferable. The compound may be used alone and in a combination of two or more thereof.

Examples of catalysts during a reaction between the phenol compound and the aldehydes include metal salts such as zinc acetate, and acids such as oxalic acid, hydrochloric acid, sulfuric acid, diethyl sulfuric acid, and p-toluenesulfonic acid. The catalysts may be used alone and in a combination of two or more thereof. The amount of the catalyst used is usually 0.01 parts by weight to 5 parts by weight with respect to 100 parts by weight of the phenol compound.

(Phenol Resin Molding Material)

The phenol resin molding material according to the present embodiment is obtained by mixing the above-described modified olefin-based polymer particle (I) and the phenol resin (II) and/or a curing agent (III) to be described later.

The weight ratio of the modified olefin-based polymer particle (I) to the phenol resin (II) is preferably 1/99 to 30/70, more preferably, 2/98 to 20/80, particularly preferably 5/95 to 10/90. When the weight ratio of the modified olefin-based polymer particle (I) to the phenol resin (II) is greater than or equal to the above-described lower limit value, it is possible to further improve the vibration absorption performance at a low temperature. In addition, when the weight ratio of the modified olefin-based polymer particle (I) to the phenol resin (II) is less than or equal to the above-described upper limit value, it is possible to further improve the heat resistance.

Examples of methods of mixing the modified olefin-based polymer particle (I), the phenol resin (II), and/or the curing agent (III) include: a method of pulverizing them to mix them in a powder form; a method of heating the modified olefin-based polymer particle (I) and the phenol resin (II) for several minutes to several hours at a temperature of 120° C. to 200° C. for melting and mixing them, and then, pulverizing them to mix them in a powder form; and a method of adding the curing agent (III) after the above-described melting and mixing, and then, pulverizing them to mix them in a powder form.

Examples of the curing agents (III) of the phenol resin molding material according to the present embodiment include paraformaldehyde and hexamethylenetetramine (hexamine). The mixing amount of the curing agent is preferably 3 parts by weight to 20 parts by weight and more preferably 5 parts by weight to 15 parts by weight with respect to 100 parts by weight of the total of the modified olefin-based polymer particle (I) and the phenol resin (II).

In addition, the phenol resin molding material of the present invention may contain various additives. Examples of the various additives include fiber, filler, lubricant, and abrasive.

The mixing amount of the additive (when a plurality of kinds of additives are added, the total amount) is preferably greater than or equal to 80 parts by weight and less than or equal to 95 parts by weight and more preferably greater than or equal to 85 parts by weight and less than or equal to 92 parts by weight when the whole of the phenol resin molding material is set as 100 parts by weight.

Examples of the above-described fibers include aramid fibers, potassium titanate, ceramic fibers, copper fibers, and glass fibers. Examples of the fillers include inorganic fillers such as barium sulfate, mica, antimony trisulfide, calcium hydroxide, magnesium carbonate, magnesium oxide, and silica, and organic fillers such as cashew dust, rubber dust, and wood powder. Examples of the above-described lubricants include graphite, antimony sulfide, and molybdenum sulfide. Examples of the above-described abrasives include zirconium oxide and iron oxide.

In addition, the phenol resin molding material according to the present embodiment may contain, as necessary, colorants, flame retardants, and coupling agents other than the above-described additives, for example.

(Cured Material of Phenol Resin Molding Material)

The cured material according to the present embodiment can be obtained by curing the above-described phenol resin molding material.

For example, it is possible to obtain the cured material by curing the phenol resin molding material according to the present embodiment by heat. It is considered that a cross-linking reaction occurs between the modified olefin-based polymer particles (I), between the phenol resins (II), and between the modified olefin-based polymer particle (I) and the phenol resin (II) and three-dimensional cross-linked structure is formed, by heating the phenol resin molding material. Accordingly, it is possible to obtain the cured material excellent in adhesiveness between the modified olefin-based polymer particle (I) as an island phase and the phenol resin (II) as a sea phase as shown in FIGS. 1 to 4, using the phenol resin molding material according to the present embodiment. As a result, it is possible to obtain a molded product excellent in mechanical strength.

An example of the method of producing the cured material according to the present embodiment includes a method of filling a metal mold or the like with the phenol resin molding material, performing heat compression molding for 5 minutes to 20 minutes under the conditions of 130° C. to 180° C. and 10 MPa to 100 MPa, and then, performing post-curing treatment at a temperature of 160° C. to 250° C. as necessary. By doing this, it is possible to obtain the phenol resin molded product composed of the cured material according to the present embodiment.

The obtained phenol resin molded product is excellent in the balance of heat resistance, hygroscopic resistance, wear resistance, mechanical strength, and vibration absorbency. Accordingly, it is possible to use the phenol resin molded product in an industrial machine, a railway vehicle, a cargo vehicle, and a frictional sliding material for an automobile.

The phenol resin molding material according to the present embodiment can be particularly favorably used as a binder for a friction material such as a disk pad or drum brake lining, and a binder for electric and electronic parts such as a semiconductor encapsulating material or a laminated sheet. In addition, the cured material of the phenol resin molding material according to the present embodiment can be particularly favorably used in a friction material such as a brake pad or whetstone.

(Particle Having Ductile Destructed Surface of Fracture Surface of Phenol Resin Molded Product)

When a fracture surface, which formed by breaking (crushing) the phenol resin molded product according to the present embodiment using a hammer or the like, is observed by a scanning type electron microscope (SEM), it can be seen that there is a modified olefin-based polymer particle (I) described above having ductile destructed surface (FIGS. 1 to 4).

The ductile destructed surface refers to a surface which is generated when the modified olefin-based polymer particle (I) is pulled at both ends, appears white, and has a swollen shape at a substantially central portion of the particle. The modified olefin-based polymer particle (I) according to the present embodiment has high adhesiveness with respect to the phenol resin. For this reason, when broken using a hammer or the like, the modified olefin-based polymer particle (I) which is closely adhered to the phenol resin is pulled at both the ends and is torn off. The mark left by the modified olefin-based polymer particle (I) torn off is the ductile destructed surface.

The number ratio of particles having a ductile destructed surface existing on the fracture surface of the phenol resin molded product according to the present embodiment is preferably greater than or equal to 40% and more preferably greater than or equal to 50%.

Figure 5:
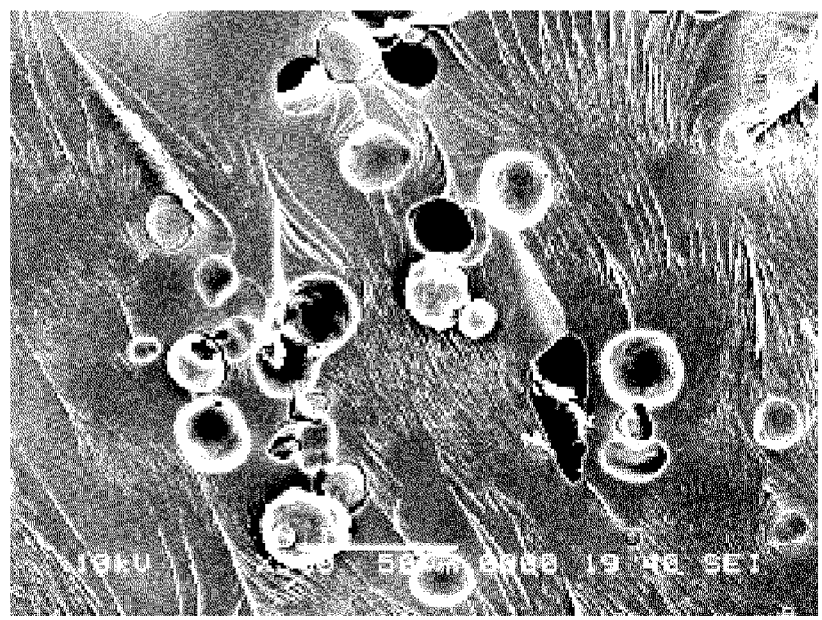
FIG. 5 shows a view showing an SEM photograph showing a fracture surface of a phenol resin molded product in Comparative Example 3.
Figure 6:
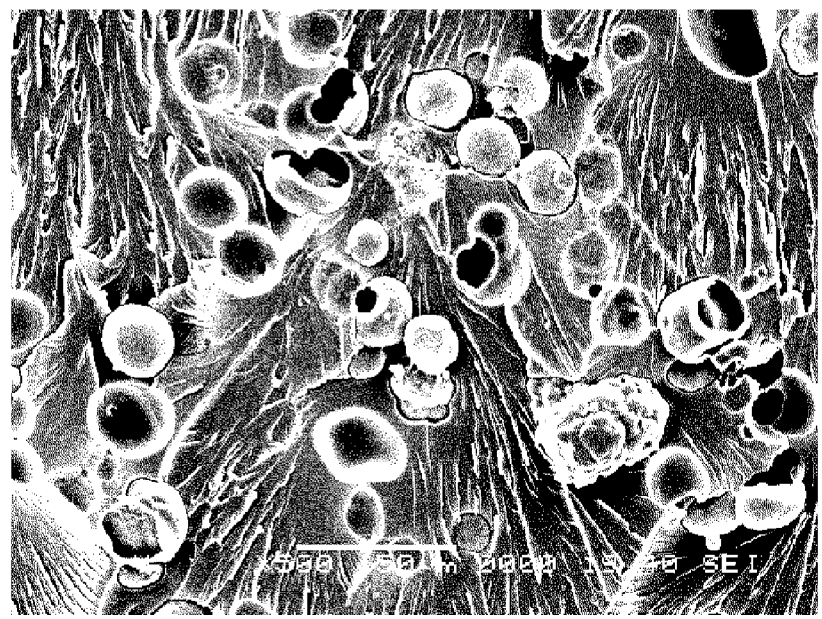
FIG. 6 shows a view showing an SEM photograph showing a fracture surface of a phenol resin molded product in Comparative Example 4.

If the adhesiveness of olefin-based polymer particle is low, a particle is left intact in one side of the broken phenol resin molded product when the phenol resin molded product is broken, and therefore, there is no ductile destructed surface generated in the particle (FIGS. 5 and 6).

It is preferable that the ductile destructed surface of the particle be observed with a SEM photograph of 200 magnifications to 500 magnifications.

EXAMPLES

Hereinafter, the present invention will be specifically described based on examples, but the present invention is not limited to the examples.

Production Example 1

In the coexistence of oxygen, 50 g of an ultra high molecular weight polyethylene particle (trade name: MIPELON XM-220, manufactured by Mitsui Chemicals, Inc., $2.0 \times 10^6$ of an average molecular weight, 30 μm of an average particle diameter, less than 0.01 g/10 minutes of MFR, and 14 dl/g of an intrinsic viscosity [η]) was irradiated with 200 kGy of electron beams. The oxygen content of the obtained carbonyl-modified ultra high molecular weight polyethylene particle was measured by an element analysis apparatus (varioELIII type: manufactured by Elementar), and as a result, the oxygen content thereof was 0.3 wt %. In addition, MFR of the carbonyl-modified ultra high molecular weight polyethylene particle was less than 0.01 g/10 minutes. The average molecular weight of the ultra high molecular weight polyethylene particle was calculated by the intrinsic viscosity [η].

Production Example 2

In the coexistence of oxygen, 50 g of an ultra high molecular weight polyethylene particle (trade name: MIPELON XM-220, manufactured by Mitsui Chemicals, Inc., $2.0 \times 10^6$ of an average molecular weight, 30 μm of an average particle diameter, less than 0.01 g/10 minutes of MFR, and 14 dl/g of an intrinsic viscosity [η]) and 5.6 g of maleic anhydride were sealed in a bag to irradiate the bag with 200 kGy of electron beams. The obtained reactant was washed once in 50 mL of acetone in the room temperature, and then, the reactant was dried. The oxygen content of the obtained maleic anhydride-modified ultra high molecular weight polyethylene particle was measured by the element analysis apparatus (varioELIII type: manufactured by Elementar), and as a result, the oxygen content thereof was 1.4 wt %. In addition, the graft ratio of the maleic anhydride which was calculated by the following expression was 2.2 wt %. In addition, MFR was less than 0.01 g/10 minutes.

Graft rate (%)=100×(weight of grafted maleic anhydride)/(weight of maleic anhydride-modified ultra high molecular weight polyethylene particle)

The graft ratio of the maleic anhydride was calculated by an analytical curve of carbonyl absorption in IR measurement.

Example 1

38 g of a phenol novolac resin (trade name: PS-6367, manufactured by Gunei Chemical Industry co., Ltd.), 2 g of the modified olefin-based polymer particle obtained in Production Example 1, and 4.8 g of hexamethylenetetramine were pulverized and mixed for 1 minute using a coffee mill grinder to obtain a phenol resin molding material. The result of the evaluation to be described later is shown in Tables 1 and 2.

Example 2

The phenol resin molding material was obtained through a method the same as that in Example 1 except that 36 g of a phenol novolac resin (trade name: PS-6367, manufactured by Gunei Chemical Industry co., Ltd.) and 4 g of the modified olefin-based polymer particle obtained in Production Example 1 were used. The result of the evaluation to be described later is shown in Tables 1 and 2.

Example 3

The phenol resin molding material was obtained through a method the same as that in Example 1 except that the modified olefin-based polymer particle was changed to the modified olefin-based polymer particle obtained in Production Example 2. The result of the evaluation to be described later is shown in Tables 1 and 2.

Example 4

The phenol resin molding material was obtained through a method the same as that in Example 2 except that the modified olefin-based polymer particle was changed to the modified olefin-based polymer particle obtained in Production Example 2. The result of the evaluation to be described later is shown in Tables 1 and 2.

Comparative Example 1

40 g of a phenol novolac resin (trade name: PS-6367, manufactured by Gunei Chemical Industry co., Ltd.) and 4.8 g of hexamethylenetetramine were pulverized and mixed for 1 minute using a coffee mill grinder to obtain a phenol resin molding material. The result of the evaluation to be described later is shown in Tables 1 and 2.

Comparative Example 2

40 g of an acrylic-modified phenol novolac resin (trade name: RN-2830, manufactured by Mitsui Chemicals, Inc.) and 4.8 g of hexamethylenetetramine were pulverized and mixed for 1 minute using a coffee mill grinder to obtain a phenol resin molding material. The result of the evaluation to be described later is shown in Tables 1 and 2. 77 wt % of the above-described acrylic-modified phenol novolac resin is a phenol resin and 23 wt % thereof is acrylic rubber.

Comparative Example 3

38 g of a phenol novolac resin (trade name: PS-6367, manufactured by Gunei Chemical Industry co., Ltd.), 2 g of the olefin-based polymer particle obtained before the modification of Production Examples 1 and 2, and 4.8 g of hexamethylenetetramine were pulverized and mixed for 1 minute using a coffee mill grinder to obtain a phenol resin molding material. The result of the evaluation to be described later is shown in Tables 1 and 2.

Comparative Example 4

A procedure was performed as the same as that in Comparative Example 3 except that the amount of the phenol novolac resin (trade name: PS-6367, manufactured by Gunei Chemical Industry co., Ltd.) and the amount of the olefin-based polymer particle obtained before the modification of Production Example 1 and 2 were respectively changed to 36 g and 4 g. The result of the evaluation to be described later is shown in Tables 1 and 2.

[Manufacturing Sample for Measuring Hygroscopic Ratio, Weight Retention Ratio, and Vibration Absorbency and for Observing Fracture Surface]

The phenol resin molding materials obtained in Examples 1 to 4 and Comparative Examples 1 to 4 were heated for 10 minutes at a temperature of 150° C. to make molded products (cylinders having a diameter of 50 mm and a height of 3.5 mm), and then, the molded products were subjected to aftercure for 5 minutes at a temperature of 180° C., respectively. The obtained samples were set to samples for the measurement, respectively.

[Manufacturing Sample for Measuring Abrasion Quantity]

A phenol resin molding material having the following composition was pulverized and mixed for 5 minutes using a grinder, and then, the mixture was input to a metal mold to performing preliminary formation under the conditions of a room temperature and 30 MPa for 1 minute. Next, while moving the preliminarily formed body to another metal mold which is preheated to a temperature of 150° C. and removing the generated gas, heat pressing was performed for 10 minutes at a temperature of 150° C. and at 40 MPa.

Subsequently, aftercure was performed for 6 hours at a temperature of 180° C. The obtained molded product (pad) was set as a sample for measuring the abrasion quantity.

| | |
|---|---|
| Barium titanate fiber (reinforcing fiber) | 27.5 wt % |
| Copper fiber (reinforcing fiber) | 15.0 wt % |
| Barium sulphate (inorganic filler) | 27.0 wt % |
| Slaked line (inorganic filler) | 2.0 wt % |
| Cashew dust (inorganic filler) | 8.0 wt % |
| Graphite (lubricant) | 5.0 wt % |
| Iron oxide (abrasive) | 7.0 wt % |
| Binder*[1] | 8.5 wt % |

*[1])Phenol resin molding material obtained in Examples 1 to 4 and Comparative Examples 1 to 4

[Method of Measuring Each Physical Property]
Each physical property was measured in the following method. The result thereof is shown in Table 1.
(1) Hygroscopic Ratio The weight of a sample after being left for 120 hours at a temperature of 30° C. in a humidity atmosphere of 80% was measured to calculate the hygroscopic ratio based on the following expression.

$$\text{Hygroscopic ratio[wt \%]}=100\times(W2-W1)/W1$$

W1: Weight of sample before being left at temperature of 30° C. in humidity atmosphere of 80%
W2: Weight of sample after being left for 120 hours at temperature of 30° C. in humidity atmosphere of 80%
(Evaluation Criteria)
A: Hygroscopic ratio≤0.55%
B: 0.55%<Hygroscopic ratio≤0.60%
C: 0.60%<Hygroscopic ratio
(2) Weight Retention Ratio The weight of a sample after being left for 120 hours at a temperature of 300° C. in an air atmosphere was measured to calculate the weight retention ratio which is defined by the following expression.

$$\text{Weight retention ratio[wt \%]}=100\times(W1-W2)/W1$$

W1: Weight of sample before being left at temperature of 300° C. in air atmosphere
W2: Weight of sample after being left for 120 hours at temperature of 300° C. in air atmosphere
(Evaluation Criteria)
A: 60% Weight retention ratio
B: 40% Weight retention ratio<60%
C: Weight retention ratio<40%
(3) Abrasion Quantity After cutting out a sample, a test was performed using the sample based on a test method of Automobile Standard JASO C 406 using a brake testing machine (manufactured by Akebono Brake Industry Co., Ltd., 1/10 scale tester). The thickness of the sample before and after the test was measured to calculate the abrasion quantity defined by the following expression.

$$\text{Abrasion quantity (mm)}=T1-T2$$

T1: Thickness of sample before JASO C 406 test
T2: Thickness of sample after JASO C 406 test
(Evaluation Criteria)
A: Abrasion quantity≤1.20 mm
B: 1.20 mm<Abrasion quantity≤1.25 mm
C: 1.25 mm<Abrasion quantity
(4) Vibration Absorbency (1)

A test piece was vibrated by a hammer using an FFT analyzer measuring machine (Oros 34) in an atmosphere of 20° C. and the time required for the acceleration to be attenuated from 150 m/s² to 50 m/s² was calculated to evaluate the vibration absorbency using the value.
(Evaluation Criteria)
A: Vibration absorbency≤1.30 msec.
B: 1.30 msec.<Vibration absorbency≤1.50 msec.
C: 1.50 msec.<Vibration absorbency
(5) Vibration Absorbency (2)

A test piece was vibrated by a hammer using an FFT analyzer measuring machine (Oros 34) in an atmosphere of −20° C. and the time required for the acceleration to be attenuated from 150 m/s² to 50 m/s² was calculated to evaluate the vibration absorbency using the value of in which the required time under the condition of −20° C. was reduced to the required time under the condition of the above-described condition of 20° C.
(Evaluation Criteria)
A: Vibration absorbency≤0.40 Δmsec.
B: 0.40 Δmsec.<Vibration absorbency 0.80 Δmsec.
C: 0.80 Δmsec.<Vibration absorbency
(6) Method of Observing Fracture Surface The above-described sample for measurement was broken by a hammer and the fracture surface (arbitrary portion) thereof was photographed using an SEM (500 magnifications) to count the total number of particles of the SEM photograph and the number of particles which have a ductile destructed surface. The particles were counted in accordance with the following criteria.

The aspect ratio which is calculated by a ratio of the long diameter to the short diameter was within a range of 1.0 to 1.5 and particles having a particle diameter of 150 μm or less were counted as particles. Here, the average value of the long diameter and the short diameter was set as the particle diameter. In addition, the long diameter and the short diameter of the particle in the photograph were measured using a caliper.

Particles of which 50% or more portions were in the photograph were counted. That is, particles of which less than 50% of portions were in the photograph in the particles in the end of the photograph were excluded.

Dark-colored portions of a mark left by a particle that came out were counted as particles.

When the particles were aggregated, a particle which is clearly recognized as a particle was counted as a particle.
(Comprehensive Evaluation Criteria)

The resin molding materials were comprehensively evaluated in accordance with the following criteria.
A: Materials, all of which was A
B: Materials, more than one of which was B and which had no C
C: Materials, more than one of which was C As is clear from the SEM photographs of FIGS. 1 to 4, in the modified olefin-based polymer particle (I) according to the present embodiment, any separation of the interface between the polyolefin particle and the phenol resin was not observed. From the observation of shear of the olefin-based polymer particle, it is obvious that the adhesiveness between the polyolefin particle and the phenol resin is improved.

In contrast, as is clear from the SEM photographs of FIGS. 5 and 6, in the phenol resin molding material containing the phenol resin and the high molecular weight polyethylene, separation of the interface between the phenol resin and the high molecular weight polyethylene was observed. In addition, any particle having ductile destructed surface was not observed.

TABLE 1

| | Unit | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Phenol Resin | wt % | 95 | 90 | 95 | 90 | 100 | 77 | 95 | 90 |
| Non-Modified Polyethylene | wt % | — | — | — | — | — | — | 5 | 10 |
| Modified Polyethylene (Production Example 1) | wt % | 5 | 10 | — | — | — | — | — | — |
| Modified Polyethylene (Production Example 2) | wt % | — | — | 5 | 10 | — | — | — | — |
| Hygroscopic Ratio | % | 0.35 | 0.35 | 0.36 | 0.37 | 0.34 | 0.93 | 0.56 | 1.08 |
| Weight Retention Ratio | % | 83.4 | 84.3 | 84.7 | 82.8 | 85.2 | 39.7 | 83.5 | 80.0 |
| Abrasion Quantity | mm | 1.17 | 1.20 | 1.05 | 1.07 | 1.26 | 1.33 | 1.24 | 1.27 |
| Vibration Absorbency 20° C. | msec. | 0.89 | 1.07 | 1.25 | 1.29 | 1.33 | 0.57 | 1.44 | 1.34 |
| Vibration Absorbency −20° C. | msec. | 1.19 | 1.09 | 1.57 | 1.46 | 2.16 | 1.97 | 1.85 | 1.76 |
| Vibration Absorbency (−20° C.)-(20° C.) | Δ msec. | 0.30 | 0.02 | 0.32 | 0.17 | 0.83 | 1.40 | 0.41 | 0.42 |
| Comprehensive Evaluation | | A | A | A | A | C | C | B | C |

TABLE 2

|  | Unit | Example 1 | Example 2 | Example 3 | Example 4 | Comparative Example 3 | Comparative Example 4 |
|---|---|---|---|---|---|---|---|
| Number of Particles Having Ductile Destructed Surface Existing Within Fracture Surface | piece | 24 | 27 | 25 | 32 | 0 | 0 |
| Total Number of Particles Existing in Fracture Surface | piece | 32 | 42 | 39 | 41 | 30 | 45 |
| Number Ratio of Particles Having Ductile Destructed Surface | % | 75 | 64 | 64 | 78 | 0 | 0 |

The invention includes the following modes.

(Supplementary Note 1)

A phenol resin molding material including: an olefin-based polymer particle (I) and a phenol resin (II), in which the above-described olefin-based polymer particle (I) satisfies the following requirements (A), (B), and (C).

(A) Inclusion of at least one element selected from a group consisting of a group 15 element, a group 16 element, and a group 17 element of the periodic table.

(B) When the whole of the above-described olefin-based polymer particle (I) is set as 100 wt %, the content of the above-described elements is greater than or equal to 0.05 wt % and less than or equal to 50 wt %.

(C) MFR which is measured under the conditions of 190° C. and 2.16 kgf based on JIS K 7210 is less than 3 g/10 minutes.

(Supplementary Note 2)

The phenol resin molding material according to the supplementary note 1, in which the average particle diameter $d_{50}$ in weight base particle size distribution, which is measured by a coulter counter method, of the above-described olefin-based polymer particle (I) is less than or equal to 150 μm.

(Supplementary Note 3)

The phenol resin molding material according to any one of the supplementary note 1 or 2, in which the weight ratio of the above-described olefin-based polymer particle (I) to the above-described phenol resin (II) is greater than or equal to 1/99 and less than or equal to 30/70.

(Supplementary Note 4)

The phenol resin molding material according to any one of the supplementary notes 1 to 3, in which the above-described olefin-based polymer particle (I) is obtained by modifying a polyolefin particle using at least one kind of an oxygen-containing group selected from a group consisting of a carbonyl group and a hydroxyl group, and includes a modified polyolefin particle.

(Supplementary Note 5)

The phenol resin molding material according to any one of the supplementary notes 1 to 3, in which the above-described olefin-based polymer particle (I) is obtained by modifying a polyolefin particle using at least one kind of carboxylic acid derivative selected from a group consisting of carboxylic acid, carboxylic acid anhydride, carboxylate, and carboxylic acid ester which contain an ethylenically unsaturated group, and includes the modified polyolefin particle.

(Supplementary Note 6)

The phenol resin molding material according to the supplementary note 4 or 5, in which the above-described polyolefin particle includes polyethylene.

(Supplementary Note 7)

The phenol resin molding material according to any one of the supplementary notes 4 to 6, in which the intrinsic viscosity [η] of the above-described polyolefin particle which is measured at a temperature of 135° C. in decalin is greater than or equal to 1 dl/g and less than or equal to 50 dl/g.

(Supplementary Note 8)

The phenol resin molding material according to any one of the supplementary notes 4 to 7, in which the weight average molecular weight, of the above-described polyolefin particle which is measured by high temperature GPC is greater than or equal to $1.0 \times 10^6$.

(Supplementary Note 9)

The phenol resin molding material according to any one of the supplementary notes 1 to 8, in which the phenol resin molding material further includes curing agent (III).

(Supplementary Note 10)

The phenol resin molding material according to the supplementary note 9, in which the mixing amount of the above-described curing agent (III) is greater than or equal to 3 parts by weight and less than or equal to 20 parts by weight when the total of the above-described olefin-based polymer particle (I) and the above-described phenol resin (II) is set as 100 parts by weight.

(Supplementary Note 11)

The phenol resin molding material according to any one of the supplementary notes 1 to 10, further including: at least one kind of additive selected from a group consisting of fiber, filler, lubricant, and abrasive, in which the mixing amount of the above-described additive is greater than or equal to 80 parts by weight and less than or equal to 95 parts by weight when the whole of the phenol resin molding material was set as 100 parts by weight.

(Supplementary Note 12)

A friction material which is obtained by curing the phenol resin molding material according to any one of the supplementary notes 1 to 11.

(Supplementary Note 13)

The friction material according to the supplementary note 12 which is used in a brake pad or whetstone.

(Supplementary Note 14)

A phenol resin molded product obtained by thermally molding a molding material containing a phenol resin and an olefin-based polymer particle, in which a particle having a ductile destructed surface exists on a fracture surface which is formed by crushing the phenol resin molded product.

(Supplementary Note 15)

The phenol resin molded product according to the supplementary note 14, in which the number ratio of the above-described particles having a ductile destructed surface existing on the above-described fracture surface is greater than or equal to 40%.

Priority is claimed on Japanese Patent Application No. 2012-076575, filed Mar. 29, 2012, the whole disclosure of which is incorporated herein by reference.

The invention claimed is:

1. A phenol resin molding material comprising: a modified olefin-based polymer particle (I) and a phenol resin (II), wherein the modified olefin-based polymer particle (I) is obtained by modifying a polyolefin particle composed of a polymer using ethylene as a monomer of which the intrinsic viscosity [η] which is measured at a temperature of 135° C. in decalin is greater than or equal to 5 dl/g and less than or equal to 40 dl/g, and wherein the modified olefin-based polymer particle is obtained by modifying the polyolefin particle using a carbonyl group, wherein the modified olefin-based polymer particle (I) satisfies the following requirements (A) and (B), (A) inclusion of oxygen, (B) when the whole of the modified olefin-based polymer particle (I) is 100 wt %, the content of oxygen is greater than or equal to 0.05 wt % and less than or equal to 50 wt %, and wherein the weight ratio of the modified olefin-based polymer particle (I) to the phenol resin (II) is greater than or equal to 1/99 and less than or equal to 10/90.

2. The phenol resin molding material according to claim 1, wherein the modified olefin-based polymer particle (I) is obtained by modifying the polyolefin particle using at least one kind of carboxylic acid derivative selected from a group consisting of carboxylic acid, carboxylic acid anhydride, and carboxylic acid ester which contain an ethylenically unsaturated group.

3. The phenol resin molding material according to claim 1, wherein the phenol resin molding material further comprises curing agent (Ill).

4. The phenol resin molding material according to claim 3, wherein the mixing amount of the curing agent (Ill) is greater than or equal to 3 parts by weight and less than or equal to 20 parts by weight when the total of the modified olefin-based polymer particle (I) and the phenol resin (II) is 100 parts by weight.

5. The phenol resin molding material according to claim 1, further comprising: at least one kind of additive selected from a group consisting of fiber, filler, lubricant, and abrasive, wherein the mixing amount of the additive is greater than or equal to 80 parts by weight and less than or equal to 95 parts by weight when the whole of the phenol resin molding material is 100 parts by weight.

6. A friction material which is obtained by curing the phenol resin molding material according to claim 1.

7. The friction material according to claim 6 which is used in a brake pad or whetstone.

8. A phenol resin molded product obtained by thermally molding a the phenol resin molding material according to claim 1, wherein a particle having a ductile destructed surface exists on a fracture surface, and wherein the number ratio of particles having a ductile destructed surface existing on the fracture surface is greater than or equal to 40%.

9. The phenol resin molding material according to claim 1, wherein the average particle diameter $d_{50}$ in weight base particle size distribution of the polyolefin particle is less than or equal to 150 μm, which is measured by a coulter counter method.

* * * * *